US012244010B2

(12) United States Patent
Kwak et al.

(10) Patent No.: US 12,244,010 B2
(45) Date of Patent: Mar. 4, 2025

(54) METHOD FOR PREPARING POSITIVE ELECTRODE ACTIVE MATERIAL FOR LITHIUM SECONDARY BATTERY, POSITIVE ELECTRODE COMPRISING THE POSITIVE ELECTRODE ACTIVE MATERIAL PREPARED BY THE SAME AND LITHIUM SECONDARY BATTERY

(71) Applicant: LG Chem, Ltd., Seoul (KR)

(72) Inventors: Ick Soon Kwak, Daejeon (KR); Chang Wan Chae, Daejeon (KR); Hyo Joung Nam, Daejeon (KR); Hye Ji Jeon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 271 days.

(21) Appl. No.: 17/605,806

(22) PCT Filed: Jan. 11, 2021

(86) PCT No.: PCT/KR2021/000312
§ 371 (c)(1),
(2) Date: Oct. 22, 2021

(87) PCT Pub. No.: WO2021/141463
PCT Pub. Date: Jul. 15, 2021

(65) Prior Publication Data
US 2022/0209231 A1 Jun. 30, 2022

(30) Foreign Application Priority Data
Jan. 10, 2020 (KR) .................. 10-2020-0003833

(51) Int. Cl.
*H01M 4/525* (2010.01)
*C01G 53/50* (2025.01)
*H01M 4/04* (2006.01)
*H01M 4/36* (2006.01)
*H01M 4/505* (2010.01)
*H01M 4/58* (2010.01)
*H01M 10/0525* (2010.01)
*H01M 4/02* (2006.01)

(52) U.S. Cl.
CPC ............ *H01M 4/525* (2013.01); *C01G 53/50* (2013.01); *H01M 4/0471* (2013.01); *H01M 4/366* (2013.01); *H01M 4/505* (2013.01); *H01M 4/5825* (2013.01); *H01M 10/0525* (2013.01); *C01P 2004/61* (2013.01); *C01P 2004/80* (2013.01); *C01P 2006/40* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| | | |
|---|---|---|
| 4,980,080 A | 12/1990 | Lecerf et al. |
| 6,103,421 A | 8/2000 | Torata et al. |
| 2002/0009643 A1 | 1/2002 | Torata et al. |
| 2003/0129495 A1 | 7/2003 | Yamato et al. |
| 2008/0108529 A1 | 5/2008 | Hobson et al. |
| 2014/0134491 A1 | 5/2014 | Sugimoto et al. |
| 2017/0233261 A1 | 8/2017 | Sharma |
| 2018/0034050 A1 | 2/2018 | Son et al. |
| 2018/0287135 A1 | 10/2018 | Shin et al. |
| 2019/0181445 A1* | 6/2019 | Lee ................... C01G 53/50 |
| 2020/0083532 A1 | 3/2020 | Kageura et al. |
| 2020/0266439 A1 | 8/2020 | Park et al. |
| 2020/0381727 A1 | 12/2020 | Kumakura et al. |
| 2020/0407624 A1 | 12/2020 | Gouda et al. |
| 2021/0020933 A1 | 1/2021 | Kamata et al. |
| 2021/0036317 A1 | 2/2021 | Choi et al. |
| 2021/0167379 A1 | 6/2021 | Kim et al. |
| 2022/0209231 A1 | 6/2022 | Kwak et al. |

FOREIGN PATENT DOCUMENTS

| | | | |
|---|---|---|---|
| CN | 107925068 A | 4/2018 | |
| CN | 108011144 A | 5/2018 | |
| CN | 110692154 A | 1/2020 | |
| CN | 110809563 A | 2/2020 | |
| CN | 112216834 A * | 1/2021 | ........ H01M 10/0525 |
| EP | 3331067 A1 | 6/2018 | |
| EP | 3536667 A1 | 9/2019 | |
| EP | 3633774 A1 | 4/2020 | |
| JP | H08180863 A | 7/1996 | |
| JP | 2673009 B2 | 11/1997 | |
| JP | 3482424 B2 | 12/2003 | |
| JP | 2006151707 A | 6/2006 | |
| JP | 2006265023 A | 10/2006 | |
| JP | 2011178584 A * | 9/2011 | |

(Continued)

OTHER PUBLICATIONS

Search report from International Application No. PCT/KR2021/000312, mailed Apr. 14, 2021.

(Continued)

*Primary Examiner* — Tanisha Diggs
(74) *Attorney, Agent, or Firm* — Lerner David LLP

(57) ABSTRACT

Provided are a manufacturing method of a positive electrode active material for a lithium secondary battery including: a first step of dry-mixing a transition metal hydroxide and an anhydrous lithium raw material; a second step of subjecting the mixture of the transition metal hydroxide and the anhydrous lithium raw material to primarily firing; and a third step of finely pulverizing and mixing the primarily fired material and performing secondary firing, and thus obtaining a lithium transition metal oxide, wherein, in the first step, the anhydrous lithium raw material is mixed at 40 parts by weight or less based on 100 parts by weight of the transition metal hydroxide, and a positive electrode for a lithium secondary battery including a positive electrode active material manufactured by the above-described manufacturing method, and a lithium secondary battery.

8 Claims, 1 Drawing Sheet

(56) References Cited

FOREIGN PATENT DOCUMENTS

| | | | |
|---|---|---|---|
| JP | 2018090485 | A | 6/2018 |
| JP | 6368022 | B1 | 8/2018 |
| JP | 2018534734 | A | 11/2018 |
| JP | 2019011241 | A | 1/2019 |
| JP | 2019096424 | A | 6/2019 |
| KR | 20020070495 | A | 9/2002 |
| KR | 20090082465 | A | 7/2009 |
| KR | 20140081663 | A | 7/2014 |
| KR | 101440241 | B1 | 9/2014 |
| KR | 20170063395 | A | 6/2017 |
| KR | 20170088873 | A | 8/2017 |
| KR | 20190007801 | A | 1/2019 |
| KR | 20190054986 | A | 5/2019 |
| KR | 20190129615 | A * | 11/2019 |
| KR | 20200014293 | A | 2/2020 |
| KR | 20210067548 | A | 6/2021 |
| KR | 20210090567 | A | 7/2021 |
| WO | 2012176471 | A1 | 12/2012 |
| WO | 2017095134 | A1 | 6/2017 |
| WO | 2018221442 | A1 | 12/2018 |
| WO | 2019013587 | A1 | 1/2019 |
| WO | WO-2019102766 | A1 * | 5/2019 ............. C01D 15/02 |
| WO | 2019123306 | A1 | 6/2019 |
| WO | 2019168110 | A1 | 9/2019 |

OTHER PUBLICATIONS

Extended European Search Report including Written Opinion for Application No. 21738572.3 dated Jul. 26, 2022, pp. 1-7.

* cited by examiner

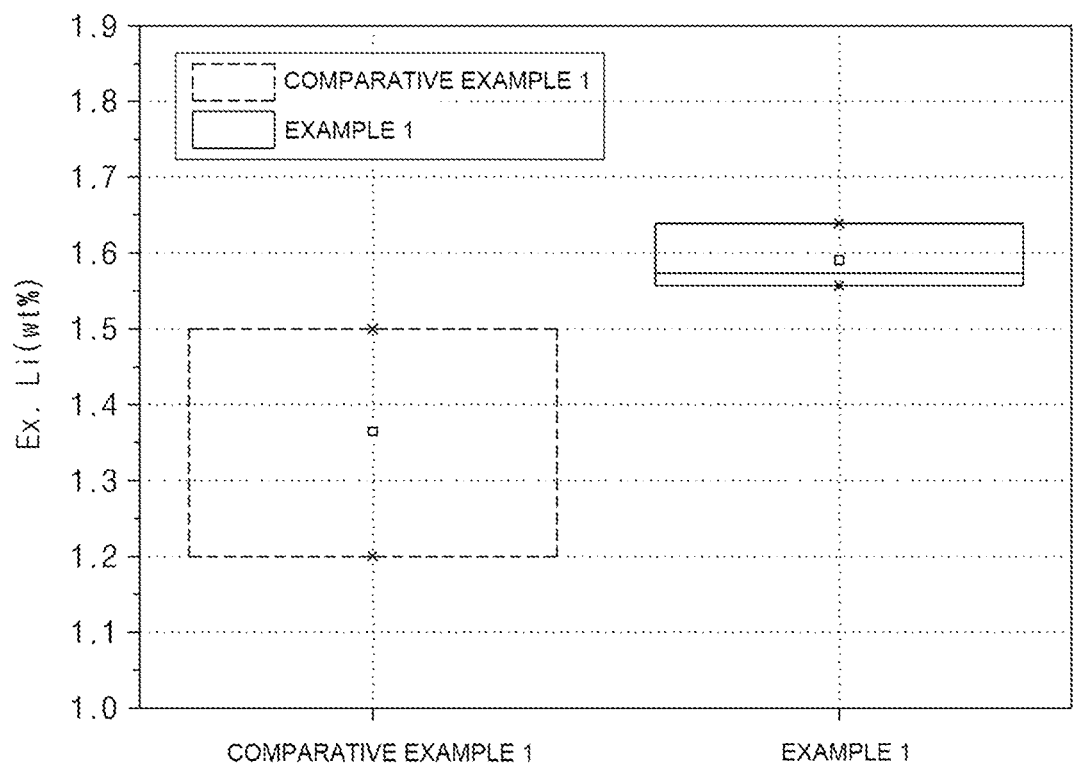

METHOD FOR PREPARING POSITIVE ELECTRODE ACTIVE MATERIAL FOR LITHIUM SECONDARY BATTERY, POSITIVE ELECTRODE COMPRISING THE POSITIVE ELECTRODE ACTIVE MATERIAL PREPARED BY THE SAME AND LITHIUM SECONDARY BATTERY

CROSS-REFERENCE TO RELATED APPLICATIONS

The present application is a national phase entry under 35 U.S.C. § 371 of International Application No. PCT/KR2021/000312, mailed Jan. 11, 2021, which claims priority from Korean Patent Application No. 10-2020-0003833, filed on Jan. 10, 2020, the disclosures of which are incorporated herein by reference in their entirety.

TECHNICAL FIELD

The present invention relates to a manufacturing method of a positive electrode active material for a lithium secondary battery, a positive electrode for a lithium secondary battery including a positive electrode active material manufactured by the manufacturing method, and a lithium secondary battery.

BACKGROUND ART

Due to developments in technology and increased demand for mobile devices, the demand for secondary batteries as an energy source is rapidly increasing. Among these secondary batteries, lithium secondary batteries having a high energy density and a high voltage, a long cycle lifespan, and a low self-discharge rate have been commercialized and are widely used.

Lithium transition metal composite oxides have been used as positive electrode active materials for lithium secondary batteries, and among these, lithium cobalt composite metal oxides such as $LiCoO_2$, which have a high operating voltage and excellent capacity characteristics, have been mainly used. However, $LiCoO_2$ has an unstable crystal structure due to lithium deintercalation and thus has extremely poor thermal properties. In addition, since $LiCoO_2$ is expensive, it has limitations in mass use thereof as a power source in fields such as electric vehicles.

As an alternative for $LiCoO_2$, a lithium manganese composite metal oxide ($LiMnO_2$, $LiMn_2O_4$, etc.), a lithium iron phosphate compound ($LiFePO_4$, etc.), or a lithium nickel composite metal oxide ($LiNiO_2$, etc.) was developed. Among these, there have been particularly active research efforts to develop lithium nickel composite metal oxides which can easily implement a high-capacity battery due to having a high reversible capacity of about 200 mAh/g. However, the $LiNiO_2$ has low thermal stability as compared to $LiCoO_2$, and when an internal short circuit occurs in a charged state due to pressure applied from the outside or the like, the positive electrode active material itself is decomposed, causing the battery to rupture and ignite.

Accordingly, in order to improve low thermal stability while maintaining the excellent reversible capacity of $LiNiO_2$, lithium transition metal oxides in which a part of nickel (Ni) is substituted with cobalt (Co), manganese (Mn), or aluminum (Al) have been developed. In addition, to solve the stability problem due to the elution of metal elements and the like and attain excellent output characteristics, lithium transition metal oxides having a metal composition with a concentration gradient have been proposed.

In a representative manufacturing method of a positive electrode active material, a positive electrode active material is synthesized by mixing and firing a positive electrode active material precursor and a lithium raw material and allowing an oxidation reaction between lithium and the precursor, and conventionally, $LiOH·H_2O$, which is a hydrate, was used as the lithium raw material.

However, when $LiOH·H_2O$, which is a hydrate, was used as the lithium raw material, reactivity between the lithium raw material and the precursor was lowered, resulting in lower yield and lower productivity.

Therefore, there is a need for the development of a manufacturing method capable of achieving an effect of improving productivity by improving reactivity with the precursor when synthesizing a positive electrode active material.

RELATED-ART DOCUMENT (Patent Document 1) Japanese Patent No. 2673009

DISCLOSURE

Technical Problem

The present invention is directed to providing a method of manufacturing a positive electrode active material capable of improving the production yield and productivity of a positive electrode active material by improving reactivity between a precursor and a lithium raw material.

In addition, the present invention is directed to providing a positive electrode including a positive electrode active material manufactured by a method of manufacturing a positive electrode active material of the present invention.

In addition, the present invention is directed to providing a lithium secondary battery including the above-described positive electrode.

Technical Solution

One aspect of the present invention provides a method of manufacturing a positive electrode active material, which includes: a first step of dry-mixing a transition metal hydroxide and an anhydrous lithium raw material; a second step of subjecting the mixture to primarily firing; and a third step of finely pulverizing and mixing the primarily fired material and subsequently performing secondary firing, and thus obtaining a lithium transition metal oxide, wherein, in the first step, the anhydrous lithium raw material is mixed at 40 parts by weight or less based on 100 parts by weight of the transition metal hydroxide.

Another aspect of the present invention provides a positive electrode for a lithium secondary battery, which includes a positive electrode active material manufactured by the above-described method of manufacturing a positive electrode active material.

Still another aspect of the present invention provides a lithium secondary battery, which includes the above-described positive electrode for a lithium secondary battery.

Advantageous Effects

According to a manufacturing method of the present invention in which an anhydrous lithium raw material having excellent reactivity with a positive electrode active material precursor is used in the manufacture of a positive electrode active material, since the usage amount of lithium raw material is reduced, production yield can be improved, and the degradation of the quality of the positive electrode active material due to moisture contained in the lithium raw material can be prevented. Therefore, according to the manufacturing method of the present invention, a positive electrode active material having increased productivity and uniform and excellent quality can be produced.

In addition, since reactivity between the positive electrode active material precursor and the anhydrous lithium raw material is improved, a positive electrode active material of excellent quality can be easily synthesized even when a relatively small amount of lithium raw material is used or firing time is shortened as compared to the case of using a conventional hydrated lithium raw material.

In addition, according to a manufacturing method of the present invention, since a positive electrode active material is subjected to two firing steps so that water and/or carbon dioxide reaction by-products during the primary firing can be removed, the true density of the primarily fired material is increased and thus an increased amount of reactants can be contained in the same reactor volume during secondary firing, and as a result, production is significantly increased.

DESCRIPTION OF DRAWINGS

FIGURE is a graph illustrating the quality variance of secondary batteries including a positive electrode active material of Example 1 of the present invention and Comparative Example 1.

BEST MODE

Hereinafter, the present invention will be described in more detail.

Terms and words used in this specification and the claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technical spirit of the present invention.

Method of Manufacturing Positive Electrode Active Material

The present inventors have found that the productivity and quality of a positive electrode active material can be remarkably increased by using an anhydrous lithium raw material and performing two firing steps in the manufacture of a positive electrode active material, and thereby completed the present invention.

Specifically, a method of manufacturing a positive electrode active material according to the present invention includes: a first step of dry-mixing a transition metal hydroxide and an anhydrous lithium raw material; a second step of primarily firing the mixture of the transition metal hydroxide and the anhydrous lithium raw material; and a third step of finely pulverizing and mixing the primarily fired material and subsequently performing secondary firing, and thus obtaining a lithium transition metal oxide, wherein, in the first step, the anhydrous lithium raw material is mixed at 40 parts by weight or less based on 100 parts by weight of the transition metal hydroxide.

Hereinafter, the method of manufacturing a positive electrode active material according to the present invention will be described in more detail.

First, a transition metal hydroxide is provided.

The transition metal hydroxide of the present invention may include one or more transition metals among Ni, Co, and Mn and is preferably represented by the following Chemical Formula 1.

  [Chemical Formula 1]

$$Ni_xCo_yM^1_z(OH)_2$$

In the above Chemical Formula 1, $M^1$ may be Mn, Al, or a combination thereof, and is preferably Mn.

Meanwhile, x represents the molar ratio of Ni elements in the transition metal hydroxide, and may be $0<x<1$, $0.3<x\leq1$, $0.6\leq x<1$, $0.8\leq x<1$, or $0.85\leq x<1$.

In the above, y represents the molar ratio of Co in the transition metal hydroxide, and may be $0<y<1$, $0<y\leq0.5$, $0<y\leq0.3$, $0<y\leq0.2$, or $0<y\leq0.15$.

In the above, z represents the molar ratio of metal elements $M^1$ in the transition metal hydroxide, and may be $0\leq z<1$, $0\leq z\leq0.5$, $0\leq z\leq0.3$, $0\leq z\leq0.2$, or $0\leq z\leq0.15$.

When the transition metal molar ratios, x, y, and z, in the transition metal hydroxide satisfy the above-described ranges, a positive electrode active material having excellent energy density and high-capacity characteristics can be obtained.

The transition metal hydroxide represented by Chemical Formula 1 may be commercially purchased and used, or may be prepared according to a method of preparing a transition metal hydroxide well known in the art, such as a co-precipitation method.

The transition metal hydroxide provided above and an anhydrous lithium raw material are dry-mixed (first step).

The anhydrous lithium raw material may be, for example, anhydrous lithium hydroxide (LiOH).

Conventionally, $LiOH \cdot H_2O$, which is a hydrate, was mainly used as a lithium raw material in the manufacture of a positive electrode active material. In general, when manufacturing lithium hydroxide, a chemical purification process is performed to increase purity, and since water molecules are generated in this process, hydrated lithium hydroxide is produced.

In order to manufacture anhydrous lithium hydroxide from the hydrated lithium hydroxide, the water contained in the lithium hydroxide should be removed through a drying process, but drying bulk hydrated lithium hydroxide is an energy-consuming, costly, and difficult process. Therefore, conventionally, it was common to use hydrated lithium hydroxide as a lithium raw material when manufacturing a positive electrode active material.

However, when using hydrated lithium hydroxide, since reactivity between lithium and a transition metal hydroxide was inhibited by water molecules in lithium hydroxide when lithium was transferred to the transition metal hydroxide at the initial stage of the reaction, a rather excessive amount of lithium hydroxide had to be used in order to manufacture a positive electrode active material with satisfactory quality, and therefore, the production yield of the positive electrode active material decreased. In addition, when mixing a hydrated lithium raw material and a transition metal hydroxide and firing the mixture, since the supplied thermal energy was consumed for vaporizing water and thus the thermal energy available for a reaction between the lithium raw material and the transition metal hydroxide decreased, firing had to be carried out at a relatively high temperature to achieve a sufficient reaction.

In addition, as water in the lithium raw material was vaporized, crater-shaped holes were formed on the surface of the fired material, resulting in the high quality variance of the finally manufactured positive electrode active material and local performance degradation.

On the other hand, when using anhydrous lithium hydroxide as a lithium raw material as in the present invention, since the lithium raw material does not contain water molecules, reactivity between a transition metal hydroxide and the lithium raw material is improved, so a positive electrode active material with excellent quality can be manufactured using a relatively small amount of lithium raw material compared to a conventional case, and accordingly, the production yield of a positive electrode active material can be improved.

In addition, when using anhydrous lithium hydroxide, since thermal energy is not consumed for vaporizing water molecules, even when firing is performed at a lower temperature than when a hydrated lithium raw material is used, a positive electrode active material with excellent properties can be manufactured, and since no surface holes are formed due to the vaporization of water molecules, the quality uniformity of the positive electrode active material is also excellent.

Meanwhile, the anhydrous lithium hydroxide (LiOH) used in the present invention may be prepared, for example, by primarily pulverizing hydrated lithium hydroxide (LiOH·H$_2$O), vacuum-drying the primarily pulverized lithium hydroxide, and then secondarily pulverizing the vacuum-dried lithium hydroxide.

More specifically, the anhydrous lithium hydroxide (LiOH) of the present invention may be prepared by primarily pulverizing hydrated lithium hydroxide having an average particle size ($D_{50}$) of 300 μm or more until the average particle size ($D_{50}$) becomes 50 to 250 μm and preferably 50 to 150 μm, vacuum-drying the primarily pulverized lithium hydroxide at 100 to 150° C. for 1 to 30 hours and preferably 10 to 30 hours, and then secondarily pulverizing the resultant until the average particle size ($D_{50}$) becomes 5 to 30 μm and preferably 10 to 20 μm.

When hydrated lithium hydroxide is primarily pulverized and then vacuum-dried as in the present invention, anhydrous lithium hydroxide can be obtained with much less energy than when bulk hydrated lithium hydroxide is dried.

However, when the particle size of lithium hydroxide is excessively small after primary pulverization, side effects such as the scattering of fine powder and clogging of a filter may occur during the vacuum-drying process due to the increase in generation of fine powder, and thus drying yield may be reduced, and when the particle size of the lithium hydroxide is excessively large, since vacuum-drying time is increased, energy consumption may be increased and secondary pulverization efficiency may be lowered. Therefore, the primary pulverization is preferably performed until the average particle size ($D_{50}$) of lithium hydroxide is about 50 to 250 μm and preferably about 50 to 150 μm.

Meanwhile, when a vacuum-drying temperature is excessively low or a vacuum-drying time is excessively short, water molecules in the lithium raw material may not be completely removed, and when the vacuum-drying temperature is excessively high or vacuum-drying time is excessively long, lithium hydroxide may be converted into lithium carbonate or the like during a drying process. Therefore, the vacuum-drying is preferably performed at 100 to 150° C. for 1 to 30 hours and preferably 10 to 30 hours.

Meanwhile, when the average particle size of lithium hydroxide is excessively large after secondary pulverization, since reactivity between the transition metal hydroxide and the lithium hydroxide is lowered, the performance of a finally manufactured positive electrode active material may be negatively affected, and when the average particle size is excessively small, problems such as reduced flowability, high vulnerability to moisture, and clogging of a pipe may occur. Therefore, the secondary pulverization is preferably performed until the average particle size ($D_{50}$) of lithium hydroxide is about 5 to 30 μm and preferably about 10 to 20 μm.

Here, the average particle size ($D_{50}$) refers to a particle size corresponding to the 50% cumulative volume in a particle size distribution. The $D_{50}$ can be measured using a laser diffraction method. Specifically, after dispersing the powder to be measured in a dispersion medium (distilled water) and introducing the dispersion into a commercially available laser diffraction particle size measuring instrument (e.g., Microtrac S3500), a particle size distribution can be calculated by measuring the difference in diffraction pattern according to particle size when the particles pass through a laser beam.

When anhydrous lithium hydroxide is used as a lithium raw material as in the present invention, since reactivity with a transition metal hydroxide is improved, even when a relatively small amount of lithium raw material is added, the oxidation reaction between lithium and the transition metal hydroxide occurs easily, so a lithium transition metal oxide can be easily synthesized. In addition, since the input amount of the lithium raw material is reduced, a lithium transition metal oxide can be easily synthesized even when subsequent firing time is reduced as compared to the case of using hydrated lithium hydroxide.

Preferably, in the present invention, the anhydrous lithium raw material may be dry-mixed at 40 parts by weight or less and preferably 0.2 to 40 parts by weight, 10 to 40 parts by weight, 20 to 40 parts by weight, or 25 to 35 parts by weight based on 100 parts by weight of the transition metal hydroxide.

When the input amount of the anhydrous lithium raw material exceeds 40 parts by weight, since an excessive amount of lithium is intercalated into a finally manufactured positive electrode active material structure, Ni sites in the positive electrode active material are substituted with an excessive amount of lithium, causing the amount of Ni contributing to capacity to be reduced and capacity characteristics to be degraded, and since the amount of unreacted residual lithium increases due to the introduction of excessive amount of lithium, gas generation may increase during battery operation.

Meanwhile, the dry-mixing of the anhydrous lithium raw material and a transition metal hydroxide may be carried out using a commonly used dry-mixing method such as a grinder-mixing method or a mechanofusion method, or by using a general dry-mixer (e.g., Henschel mixer, intensive mixer, Redige mixer, etc.), but the present invention is not limited thereto.

When mixing the lithium raw material and the transition metal hydroxide by a wet method, even when an anhydrous lithium raw material is used, since the anhydrous lithium raw material is dissolved in a solvent, the effect of improving reactivity and increasing productivity using the anhydrous lithium raw material cannot be achieved.

Meanwhile, when mixing the lithium raw material and the transition metal hydroxide, a material containing an additional metal element may be further added as necessary. In this case, the additional metal element may be metal $M^1$ or metal $M^2$, and the metal $M^1$ may be Mn, Al, or a combination thereof, and the metal $M^2$ may be one or more selected from the group consisting of W, Cu, Fe, V, Cr, Ti, Zr, Zn, Ta, Y, In, La, Sr, Ga, Sc, Gd, Sm, Ca, Ce, Nb, Mg, B, and Mo.

The material containing the additional metal element may be an acetate, nitrate, sulfate, halide, sulfide, hydroxide, oxide, oxyhydroxide, or the like containing the element $M^1$ or the element $M^2$. Preferably, the material containing the additional metal element may be an Al-containing material and may be, for example, $Al(OH)_3$, $Al_2O_3$, $Al_2(SO_4)_3$, $AlCl_3$, $Al(NO_3)_3$, or a combination thereof.

Next, the mixture obtained in the first step is subjected to primary firing (second step).

The primary firing may be carried out in an oxygen atmosphere and is preferably carried out in an oxygen atmosphere with an oxygen concentration of 80% or more by volume. When the primary firing is carried out in an oxygen atmosphere, lithium can be easily intercalated into a precursor, and the accumulation of residual lithium on the surface of the finally manufactured positive electrode active material can be inhibited. In addition, since surface defects can be suppressed, electrochemical characteristics and cycle characteristics can be improved.

Meanwhile, the primary firing may be carried out in an oxygen atmosphere at a temperature of 400 to 700° C. and preferably 550 to 700° C. When the primary firing temperature satisfies the above range, lithium ions can be smoothly diffused into the transition metal hydroxide, and as moisture and/or gas reaction by-products are removed during the primary firing process, the volume fraction of the primarily fired material relative to reactants decreases, and true density increases. Therefore, during the secondary firing process to be described below, an increased amount of reactants (primarily fired material) can be introduced into the same reactor volume as compared to the case where primary firing is not carried out, production can be remarkably increased.

Subsequently, the primarily fired material is finely pulverized, mixed, and subjected to secondary firing, and thus a lithium transition metal oxide is produced (third step).

The fine pulverization of the primarily fired material may be carried out using a common fine pulverization known in the art, such as air classifying milling (ACM) using a ball mill, a jet mill, or an internal hammer, or sieving, but the present invention is not limited thereto.

In the primarily fired material obtained after primary firing, particle agglomeration may occur locally. Therefore, by finely pulverizing and homogenizing the agglomerated particles, it is possible to improve the quality uniformity of the finally obtained positive electrode active material.

Next, the secondary firing may be carried out in an oxygen atmosphere, and is preferably carried out in an oxygen atmosphere with an oxygen concentration of 80% or more by volume.

The secondary firing may be carried out at a higher temperature than the primary firing, and for example, the secondary firing may be carried out at a temperature of 700 to 900° C. and preferably 750 to 850° C. When the secondary firing is carried out in the above temperature range, the crystal structure of a positive electrode active material is well developed, so a positive electrode active material having excellent capacity characteristics, lifespan characteristics, and high-temperature characteristics can be produced.

The positive electrode active material of the present invention manufactured by the above-described method may be a lithium transition metal oxide represented by the following Chemical Formula 2.

$$Li_{1+a}[Ni_xCo_yM^1_zM^2_w]O_2 \qquad \text{[Chemical Formula 2]}$$

In the above Chemical Formula 2, $M^1$ may be Mn, Al, or a combination thereof, and is preferably Mn or a combination of Mn and Al.

In the above, $M^2$ may be one or more selected from the group consisting of W, Cu, Fe, V, Cr, Ti, Zr, Zn, Ta, Y, In, La, Sr, Ga, Sc, Gd, Sm, Ca, Ce, Nb, Mg, B, and Mo.

In the above, 1+a represents a molar ratio of lithium (Li) in the lithium transition metal oxide, wherein $-0.2 \leq a \leq 0.2$ or $-0.1 \leq a \leq 0.1$.

In the above, x represents a molar ratio of Ni among the non-lithium metal components in the lithium transition metal oxide, and may be $0<x<1$, $0.3 \leq x<1$, $0.6 \leq x<1$, $0.8 \leq x<1$, or $0.85 \leq x<1$.

In the above, y represents a molar ratio of Co among the non-lithium metal components in the lithium transition metal oxide, and may be $0<y<1$, $0<y \leq 0.5$, $0<y \leq 0.3$, $0<y \leq 0.2$, or $0<y \leq 0.15$.

In the above, z represents a molar ratio of $M^1$ among the non-lithium metal components in the lithium transition metal oxide, and may be $0 \leq z<1$, $0 \leq z \leq 0.5$, $0 \leq z \leq 0.3$, $0 \leq z \leq 0.2$, or $0 \leq z \leq 0.15$.

In the above, w represents a molar ratio of $M^2$ among the non-lithium metal components in the lithium transition metal oxide, and may be $0 \leq w \leq 0.2$, $0 \leq w \leq 0.1$, or $0 \leq w \leq 0.05$.

More preferably, the positive electrode active material is a lithium transition metal oxide represented by the following Chemical Formula 2-1.

$$Li_{1+a}[Ni_xCo_yMn_{z1}Al_{z2}M^2_w]O_2 \qquad \text{[Chemical Formula 2-1]}$$

In the above Chemical Formula 2-1, $M^2$ may be one or more selected from the group consisting of W, Cu, Fe, V, Cr, Ti, Zr, Zn, Ta, Y, In, La, Sr, Ga, Sc, Gd, Sm, Ca, Ce, Nb, Mg, B, and Mo.

In the above, 1+a represents a molar ratio of Li in the lithium transition metal oxide, wherein $-0.2 \leq a \leq 0.2$ or $-0.1 \leq a \leq 0.1$.

In the above, x represents a molar ratio of Ni among the non-lithium metal components in the lithium transition metal oxide, and may be $0.8 \leq x<1$ or $0.85 \leq x<1$. In the above, y represents a molar ratio of Co among the non-lithium metal components in the lithium transition metal oxide, and may be $0<y<0.2$ or $0<y<0.15$.

In the above, z1 represents a molar ratio of Mn among the non-lithium metal components in the lithium transition metal oxide, and may be $0<z1<0.2$ or $0<z1<0.15$.

In the above, z2 represents a molar ratio of Al among the non-lithium metal components in the lithium transition metal oxide, and may be $0<z2<0.2$ or $0<z2<0.15$.

In the above, w represents a molar ratio of $M^2$ among the non-lithium metal components in the lithium transition metal oxide, and may be $0 \leq w<0.2$, $0 \leq w \leq 0.1$, or $0 \leq w \leq 0.05$.

Meanwhile, the method of manufacturing a positive electrode active material according to the present invention may additionally include, after the third step, an optional step of mixing the lithium transition metal oxide with a washing solution and thus removing a lithium by-product present on the surface of the lithium transition metal oxide as necessary (fourth step).

For example, the washing process may be carried out by mixing the above-described positive electrode active material with a 5 to 80° C. and preferably 10 to 60° C. washing solution (preferably distilled water) and then stirring and filtering the mixture. The washing of the positive electrode active material may be carried out by adding the washing solution at 30 to 80% and preferably 40 to 70% by weight of the positive electrode active material. However, in terms of the removal of a lithium by-product, the input amount of the washing solution may not be particularly limited.

By the washing process, a lithium by-product on the surface of the positive electrode active material is separated in the washing solution and can be easily removed from the surface of the positive electrode active material. After washing, a drying process of drying the washed material may be additionally carried out. In addition, after the fourth step, a coating layer including one or more selected from the group consisting of B, Al, Nb, W, Mo, Zr, Ti, Y, Ce, yttria-stabilized zirconia (YSZ), calcic-stabilized zirconia (CSZ), indium tin oxide (ITO), and Sr may be optionally formed on the surface of the lithium transition metal oxide as necessary (fifth step).

For example, the coating layer may be formed, on the surface of the lithium transition metal oxide dried as described above, by mixing the lithium transition metal oxide with a coating element-containing raw material including one or more selected from the group consisting of B, Al, Nb, W, Mo, Zr, Ti, Y, Ce, YSZ, CSZ, ITO, and Sr and thermally treating the mixture at a temperature of 150 to 500° C. Preferably, the coating element-containing raw material includes one or more coating elements selected from the group consisting of B, Al, and W.

For example, the coating element-containing raw material may include an oxide, hydrate, hydroxide, chloride, or oxalate of the above-described coating element. Preferably, the coating element-containing raw material includes one or more selected from the group consisting of $LiB_{a1}O_{b1}$ ($1 \le a1 \le 10$, $1 \le b1 \le 10$), $LiW_{a2}O_{b2}$ ($1 < a2 \le 10$, $1 \le b2 \le 10$), $H_3BO_3$, $Al_2O_3$, $WO_3$, and $B_2O_3$.

The coating element-containing raw material is mixed at 0.01 to 1 part by weight and preferably 0.05 to 0.5 parts by weight based on 100 parts by weight of the lithium transition metal oxide, and when the mixture is subsequently subjected to thermal treatment at 150 to 500° C. and more preferably 200 to 400° C., a lithium transition metal oxide coating layer is formed.

Due to the formation of the coating layer, since the contact between the positive electrode active material and an electrolyte included in a lithium secondary battery is blocked and thus the occurrence of side reactions is inhibited, the surface stability of the positive electrode active material can be improved. For example, when the amount of the included coating element-containing raw material is less than the above-described range, the effect of inhibiting side reactions due to the formation of the coating layer is insignificant, and when the amount of the included coating element-containing raw material exceeds the above-described range, since the amount of the coating layer is excessively increased, the coating layer may rather act as resistance and degrade capacity and resistance characteristics, and accordingly, the lifespan characteristics of a battery may be degraded.

Positive Electrode

Another aspect of the present invention provides a positive electrode for a lithium secondary battery, which includes a positive electrode active material for a lithium secondary battery with improved productivity manufactured by the above-described method of manufacturing a positive electrode active material.

Specifically, the positive electrode includes: a positive electrode current collector; and a positive electrode active material layer disposed on one or more surfaces of the positive electrode current collector and including the above-described positive electrode active material.

The positive electrode current collector is not particularly limited as long as it does not cause a chemical change in a battery and has conductivity, and for example, stainless steel, aluminum, nickel, titanium, calcined carbon, or aluminum or stainless steel whose surface has been treated with carbon, nickel, titanium, silver, or the like may be used. In addition, the positive electrode current collector may typically have a thickness of 3 to 500 μm, and the current collector may have fine irregularities formed in a surface thereof to increase the adhesion of the positive electrode active material. The positive electrode current collector may be used in any of various forms such as a film, a sheet, a foil, a net, a porous material, a foam, a non-woven fabric, and the like.

The positive electrode active material layer may include a conductive material and a binder in addition to the positive electrode active material.

In this case, the positive electrode active material may be included in an amount of 80 to 99% by weight and more preferably 85 to 98% by weight based on the total weight of the positive electrode active material layer. When the positive electrode active material is included within the above content range, excellent capacity characteristics can be exhibited.

In this case, the conductive material is used for imparting conductivity to an electrode and can be used without particular limitation as long as it does not cause a chemical change in a battery being manufactured and has electron conductivity. Specific examples thereof include: graphite such as natural graphite or artificial graphite; carbon black such as acetylene black, Ketjen black, channel black, furnace black, lamp black, or thermal black; a carbon-based material such as a carbon fiber; a metal powder or metal fiber such as copper, nickel, aluminum, or silver; a conductive whisker such as zinc oxide or potassium titanate; a conductive metal oxide such as titanium oxide; and a conductive polymer such as a polyphenylene derivative, which may be used alone or in a combination of two or more thereof. The conductive material may be included in an amount of 1 to 30% by weight based on the total weight of the positive electrode active material layer.

The binder serves to improve adhesion among the positive electrode active material particles and between the positive electrode active material and the current collector. Specific examples thereof include polyvinylidene fluoride (PVDF), a vinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene polymer (EPDM), a sulfonated-EPDM, styrene-butadiene rubber (SBR), fluororubber, or various copolymers thereof, which may be used alone or in a combination of two or more thereof. The binder may be included at 1 to 30% by weight based on the total weight of the positive electrode active material layer.

The positive electrode may be manufactured according to a conventional method of manufacturing a positive electrode except that the above-described positive electrode active material is used. Specifically, the positive electrode may be manufactured by applying a positive electrode mixture, which was prepared by dissolving or dispersing the above-described positive electrode active material and optionally a binder and a conductive material in a solvent, onto the positive electrode current collector and then drying and roll-pressing the resultant. In this case, the types and contents of the positive electrode active material, the binder, and the conductive material are the same as described above.

The solvent may be a solvent commonly used in the art, for example, dimethyl sulfoxide (DMSO), isopropyl alcohol, N-methylpyrrolidone (NMP), acetone, water, or the like, which may be used alone or in a combination of two or more thereof. The usage amount of the solvent is sufficient if it can dissolve or disperse the positive electrode active material, the conductive material, and the binder in consideration of the coating thickness of a slurry and a production yield and, at a later point in time, achieve a viscosity capable of exhibiting excellent thickness uniformity when the slurry is applied to manufacture a positive electrode.

Alternatively, the positive electrode may be manufactured by casting the above-described positive electrode mixture on a separate support and laminating a film obtained by delamination from the support on the positive electrode current collector.

Lithium Secondary Battery

In addition, according to the present invention, an electrochemical device including the above-described positive electrode may be manufactured. The electrochemical device may specifically be a battery, a capacitor, or the like, and more specifically, a lithium secondary battery.

Specifically, the lithium secondary battery includes a positive electrode, a negative electrode disposed to face the positive electrode, a separator interposed between the positive electrode and the negative electrode, and an electrolyte, and since the positive electrode is the same as described above, a detailed description thereof will be omitted, and only the remaining configuration will be described in detail below.

In addition, the lithium secondary battery may optionally further include: a battery case for accommodating an electrode assembly including the positive electrode, the negative electrode, and the separator; and a sealing member for sealing the battery case.

In the lithium secondary battery, the negative electrode includes a negative electrode current collector and a negative electrode active material layer disposed on the negative electrode current collector.

The negative electrode current collector is not particularly limited as long as it does not cause a chemical change in a battery and has high conductivity, and for example, copper, stainless steel, aluminum, nickel, titanium, calcined carbon, copper or stainless steel whose surface has been treated with carbon, nickel, titanium, silver, or the like, an aluminum-cadmium alloy, or the like may be used. In addition, the negative electrode current collector may typically have a thickness of 3 μm to 500 μm, and like in the case of the positive electrode current collector, the current collector may have fine irregularities formed in a surface thereof to increase the adhesion of a negative electrode active material. The negative electrode current collector may be used in any of various forms such as a film, a sheet, a foil, a net, a porous material, a foam, a non-woven fabric, and the like.

The negative electrode active material layer may optionally include a binder and a conductive material in addition to the negative electrode active material.

As the negative electrode active material, a compound capable of reversible intercalation and deintercalation of lithium may be used. Specific examples of the negative electrode active material include: a carbonaceous material such as artificial graphite, natural graphite, graphitized carbon fiber, or amorphous carbon; a metallic compound capable of alloying with lithium, such as Si, Al, Sn, Pb, Zn, Bi, In, Mg, Ga, Cd, an Si alloy, an Sn alloy, or an Al alloy; a metal oxide capable of doping and dedoping lithium, such as $SiO_\beta$ ($0<\beta<2$), $SnO_2$, vanadium oxide, or lithium vanadium oxide; or a composite including the metallic compound and the carbonaceous material, such as an Si—C composite or an Sn—C composite, which may be used alone or in a combination of two or more thereof. In addition, a lithium metal thin film may be used as the negative electrode active material. In addition, any of low-crystallinity carbon, high-crystallinity carbon, and the like may be used as the carbonaceous material. Representative examples of the low-crystallinity carbon include soft carbon and hard carbon, and representative examples of the high-crystallinity carbon include amorphous, platy, scaly, spherical, or fibrous natural graphite or artificial graphite, Kish graphite, pyrolytic carbon, mesophase pitch-based carbon fiber, meso-carbon microbeads, mesophase pitches, and high-temperature calcined carbon such as petroleum or coal tar pitch-derived cokes and the like.

The negative electrode active material may be included at 80% to 99% by weight based on the total weight of the negative electrode active material layer.

The binder is a component that aids in binding between the conductive material, the active material, and the current collector and may typically be added at 0.1% to 10% by weight based on the total weight of the negative electrode active material layer. Examples of the binder include PVDF, polyvinyl alcohol, CMC, starch, hydroxypropyl cellulose, regenerated cellulose, polyvinylpyrrolidone, polytetrafluoroethylene, polyethylene, polypropylene, an EPDM, a sulfonated-EPDM, SBR, nitrile-butadiene rubber, fluororubber, various copolymers thereof, and the like.

The conductive material is a component for further improving the conductivity of the negative electrode active material and may be included at 10% by weight or less and preferably 5% by weight or less based on the total weight of the negative electrode active material layer. Such a conductive material is not particularly limited as long as it does not cause a chemical change in a battery being produced and has conductivity, and for example: graphite such as natural graphite or artificial graphite, carbon black such as acetylene black, Ketjen black, channel black, furnace black, lamp black, or thermal black; a conductive fiber such as a carbon fiber or a metal fiber; fluorocarbon; a metal powder such as an aluminum powder or a nickel powder; a conductive metal oxide such as titanium oxide; and a conductive material such as a polyphenylene derivative may be used.

The negative electrode active material layer may be manufactured by applying a negative electrode mixture, which was prepared by dissolving or dispersing the negative electrode active material and optionally a binder and a conductive material in a solvent, onto the negative electrode current collector and then drying the same, or may be manufactured by casting the negative electrode mixture on a separate support and laminating a film obtained by delamination from the support on the negative electrode current collector.

Meanwhile, in the lithium secondary battery, the separator is used for separating the negative electrode and the positive electrode and providing a passage for lithium ion migration, and any separator commonly used in a lithium secondary battery may be used without particular limitation, and in particular, a separator that exhibits low resistance to the migration of electrolyte ions and has an excellent electrolyte impregnation ability is preferred. Specifically, a porous polymer film, for example, a porous polymer film formed of a polyolefin-based polymer such as an ethylene homopolymer, a propylene homopolymer, an ethylene/butene copolymer, an ethylene/hexene copolymer, or an ethylene/methacrylate copolymer or a stacked structure having two or more layers thereof, may be used. In addition, a common porous non-woven fabric, for example, a non-woven fabric made of high-melting-point glass fiber, a polyethylene terephthalate fiber, or the like, may be used. Also, in order to ensure heat resistance or mechanical strength, a coated separator that includes a ceramic component or polymer material and is optionally in a single-layer or multi-layer structure may be used.

In addition, examples of the electrolyte used in the present invention may include an organic liquid electrolyte, an inorganic liquid electrolyte, a solid polymer electrolyte, a gel-type polymer electrolyte, an inorganic solid electrolyte, a molten-type inorganic electrolyte, and the like which are usable for manufacturing a lithium secondary battery, but the present invention is not limited thereto.

Specifically, the electrolyte may include an organic solvent and a lithium salt.

As the organic solvent, any organic solvent that can serve as a medium through which ions involved in an electrical reaction of a battery can move may be used without particular limitation. Specifically, as the organic solvent, an ester-based solvent such as methyl acetate, ethyl acetate, γ-butyrolactone, or ε-caprolactone, an ether-based solvent such as dibutyl ether or tetrahydrofuran, a ketone-based solvent such as cyclohexanone, an aromatic hydrocarbon-based solvent such as benzene or fluorobenzene, a carbonate-based solvent such as dimethyl carbonate (DMC), diethyl carbonate (DEC), ethyl methyl carbonate (EMC), ethylene carbonate (EC), or propylene carbonate (PC), an alcohol-based solvent such as ethyl alcohol or isopropyl alcohol, a nitrile such as R—CN (R is a C2-C20 hydrocarbon group having a linear, branched, or cyclic structure and may include a double-bonded aromatic ring or an ether bond), an amide such as dimethylformamide, a dioxolane such as 1,3-dioxolane, a sulfolane, or the like may be used. Among these, a carbonate-based solvent is preferable, and a combination of a cyclic carbonate having high ionic conductivity and a high dielectric constant, which is capable of improving the charging/discharging performance of a battery (e.g., EC, PC, etc.), and a linear carbonate-based compound having low viscosity (e.g., EMC, DMC, DEC, etc.) is more preferable.

As the lithium salt, any compound capable of providing lithium ions used in a lithium secondary battery may be used without particular limitation. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$, or the like may be used. The lithium salt is preferably used at a concentration within the range of 0.1 to 4.0 M and preferably 0.1 to 2.0 M. When the concentration of the lithium salt satisfies this range, since the electrolyte has appropriate conductivity and viscosity, the performance of the electrolyte can be excellent, and the lithium ions can effectively move.

In the electrolyte, in addition to the above-described electrolyte components, one or more additives, for example, a haloalkylene carbonate-based compound (e.g., difluoroethylene carbonate), pyridine, triethyl phosphite, triethanolamine, a cyclic ether, ethylenediamine, n-glyme, hexamethylphosphate triamide, a nitrobenzene derivative, sulfur, a quinone imine dye, an N-substituted oxazolidinone, an N,N-substituted imidazolidine, an ethylene glycol dialkyl ether, an ammonium salt, pyrrole, 2-methoxyethanol, aluminum trichloride, and the like may be included for the purpose of enhancing the lifespan characteristics of a battery, suppressing a reduction in battery capacity, enhancing the discharge capacity of a battery, and the like. In this case, the additive may be included at 0.1 to 5 parts by weight based on 100 parts by weight of the total weight of the electrolyte.

A secondary battery including the positive electrode active material of the present invention stably exhibits excellent discharge capacity, excellent output characteristics, and excellent lifespan characteristics and thus can be usefully applied to portable devices such as mobile phones, laptop computers, and digital cameras and an electric automobile field such as hybrid electric vehicles (HEVs).

Accordingly, still another aspect of the present invention provides a battery module including the above-described lithium secondary battery as a unit cell and a battery pack including the same.

The battery module or the battery pack is applicable as a power source for one or more medium-to-large sized devices selected from among power tools, electric vehicles (EVs), including HEVs and plug-in hybrid electric vehicles (PHEVs), and power storage systems.

The external shape of the lithium secondary battery of the present invention is not particularly limited but may be a cylindrical type using a can, a prismatic type, a pouch type, a coin type, or the like.

The lithium secondary battery of the present invention can be used for a battery cell used as a power source of a small device and can be preferably used as a unit battery in medium-to-large sized battery modules including a plurality of battery cells.

Modes of the Invention

Hereinafter, the present invention will be described in detail by way of exemplary embodiments. However, the exemplary embodiments of the present invention may have various modified forms, and the scope of the present invention should not be construed as being limited to the embodiments described below. The exemplary embodiments of the present invention are provided to more completely describe the present invention to those of ordinary skill in the art.

Example 1

Hydrated lithium hydroxide ($LiOH·H_2O$) was primarily pulverized until an average particle size ($D_{50}$) of 100 μm was reached, vacuum-dried at 130° C. for 24 hours, and then secondarily pulverized until an average particle size ($D_{50}$) of 15 μm was reached, and thus anhydrous lithium hydroxide (LiOH) was obtained.

As a positive electrode active material precursor, 4,750 g of $Ni_{0.88}Co_{0.05}Mn_{0.07}(OH)_2$, 82 g of $Al(OH)_3$, and 1,343 g of the anhydrous lithium hydroxide (LiOH) prepared above were mixed. A 5-kg subdivided portion of the mixed powder was input into each of the upper and lower parts of a container having a size of 330 mm×330 mm, and primary firing was carried out for 8 hours at 630° C. in an oxygen atmosphere with an oxygen partial pressure of 80% or more by volume.

The primarily fired material (cake) obtained through the primary firing was finely pulverized using an ACM instrument (Hosokawa Micron Corporation, model name: 15BC). A 9-kg subdivided portion of the resultant was input into a container having a size of 330 mm×330 mm, and secondary firing was carried out at 780° C. for 10 hours.

Subsequently, the secondary fired material was mixed with deionized water at a weight ratio of 1:1 and washed at 25° C. for five minutes.

The washed material was mixed with $H_3BO_3$ at a weight ratio of 1:0.006 and thermally treated at 300° C. for 10 hours, and thus a positive electrode active material whose surface is coated with $LiB_2O_4$ was obtained.

Example 2

A positive electrode active material was manufactured in the same manner as in the above-described Example 1 except that the input amount of anhydrous lithium was adjusted to 1,318 g.

Comparative Example 1

4,000 g of a positive electrode active material precursor and 1,982 g of hydrated lithium hydroxide ($LiOH \cdot H_2O$) were mixed and a 4-kg subdivided portion thereof was input into a lower part of a container having a size of 330 mm×330 mm, and firing was carried out at 780° C. for 30 hours.

The firing material was finely pulverized using an ACM instrument and then sieved.

Subsequently, the obtained powder was washed and coated with $H_3BO_3$ in the same manner as in the above-described Example 1, and thereby a positive electrode active material was obtained.

Comparative Example 2

A positive electrode active material was manufactured in the same manner as in the above Comparative Example 1 except that a positive electrode active material precursor and hydrated lithium hydroxide were mixed, primary firing was carried out at 630° C. for eight hours, the primarily fired material (cake) was finely pulverized, and then secondary firing was carried out at 780° C. for 10 hours.

Comparative Example 3

A positive electrode active material was manufactured in the same manner as in the above-described Example 1 except that 1,343 g of hydrated lithium hydroxide ($LiOH \cdot H_2O$) was mixed instead of anhydrous lithium hydroxide.

Comparative Example 4

A positive electrode active material was manufactured in the same manner as in the above-described Example 1 except that 2,138 g of anhydrous lithium hydroxide (LiOH) was mixed.

Comparative Example 5

A positive electrode active material was manufactured in the same manner as in the above-described Example 1 except that secondary firing was not carried out, and primary firing was carried out at 780° C. for 10 hours.

Experimental Example 1

In order to compare the productivity of the positive electrode active material manufactured in the above-described Examples 1 and 2 and Comparative Examples 1 to 5, the amounts of positive electrode active materials manufactured in mass-production kilns of the same volume by the methods of Examples 1 and 2 and Comparative Examples 1 to 5 for one month were measured, and the results are shown in the following Table 1.

TABLE 1

|  | Productivity (tons/month) |
| --- | --- |
| Example 1 | 900 |
| Example 2 | 900 |
| Comparative Example 1 | 90 |
| Comparative Example 2 | 700 |
| Comparative Example 3 | 700 |
| Comparative Example 4 | 900 |
| Comparative Example 5 | 355 |

Referring to the above Table 1, it can be seen that the positive electrode active materials manufactured in Examples 1 and 2 had significantly improved productivity as compared to the positive electrode active materials manufactured in Comparative Examples 1 to 3, in which hydrated lithium hydroxide was used as a lithium raw material, and Comparative Example 5, in which one firing step was carried out. On the other hand, in the case of Comparative Example 4 where anhydrous lithium hydroxide was used as a lithium raw material and two firing steps were carried out, the same level of productivity as Examples 1 and 2 was exhibited.

Experimental Example 2: Quality Variance

In order to measure the quality variance of the positive electrode active materials manufactured in Example 1 and Comparative Example 1, the amount of excess lithium present on the surface of the positive electrode active materials was measured.

Specifically, the amount of excess lithium present on the surface of lithium transition metal oxide prepared by mixing and firing a positive electrode active material precursor and anhydrous lithium hydroxide in Example 1 and Comparative Example 1 before washing was measured by performing pH titration. A Metrohm pH meter was used, and pH was recorded by titrating 1 mL each time. Specifically, 5 g of each of the lithium transition metal oxide powders of Example 1 and Comparative Example 1 was mixed with 100 mL of distilled water. The pH titration was performed while adding a 1 N HCl solution to the solution, and in this case, the amount and distribution of excess lithium present on the surface of the positive electrode active materials were measured, and the results are shown in FIG. 1.

Referring to FIG. 1, it can be seen that the variance of the amount of residual lithium present on the surface of the lithium transition metal oxide of Comparative Example 1 before washing was significantly wider than the variance of the amount of residual lithium present on the surface of the lithium transition metal oxide prepared in Example 1. Since this means that the amount of lithium intercalated into the lithium transition metal oxide prepared in Comparative Example 1 was not uniform, it can be determined that the lithium transition metal oxide of Comparative Example 1 was formed with higher structural instability than the lithium transition metal oxide of Example 1.

Experimental Example 3: High-Temperature Lifespan Characteristics

Secondary batteries were manufactured using the positive electrode active materials manufactured in Examples 1 and 2 and Comparative Examples 1 to 5, and the high-temperature characteristics of each of the secondary batteries including the positive electrode active materials of Examples 1 and 2 and Comparative Examples 1 to 5 were evaluated.

First, positive electrode slurries were prepared by mixing each of the positive electrode active materials manufactured in Examples 1 and 2 and Comparative Examples 1 to 5, an acetylene black conductive material (FX35), and a PVDF binder (KF9700) in a weight ratio of 97.5:1:1.5 in an NMP solvent. The positive electrode slurry was applied on to an aluminum foil having a thickness of 80 μm, dried at 130° C., and then roll-pressed, and thus a positive electrode was obtained.

Meanwhile, graphite (AGP-8) as a negative electrode active material, carbon black (Super C65) as a conductive material, and a combination of an SBR binder (BM-L302) and CMC as a binder were used, and the negative electrode active material, the conductive material, and the binder were mixed in a weight ratio of 96:2:2 and added to water, and thus a negative electrode active material slurry was obtained. The resultant was applied onto a copper foil having a thickness of 300 μm, dried, and then roll-pressed, and thus a negative electrode was obtained.

An electrode assembly was manufactured by interposing a safety reinforced separator (SRS) between the positive electrode and the negative electrode manufactured above and placed inside a battery case, and an electrolyte was injected into the case, and thus a lithium secondary battery was manufactured. In this case, an electrolyte prepared by dissolving 0.7 M $LiPF_6$ and 0.3 M LiFSI in a mixed organic solvent including ethylene carbonate (EC) and ethyl methyl carbonate (EMC) in a volume ratio of 30:70 was injected as the electrolyte, and thus lithium secondary batteries of Examples 1 and 2 and Comparative Examples 1 to 5 were manufactured.

The lithium secondary batteries including the positive electrode active materials of Examples 1 and 2 and Comparative Examples 1 to 5 were charged at 45° C. and 1 C CC/CV until 4.25 V at 0.05 C cut-off and subsequently discharged at a constant current of 1 C to 3.0 V.

After repeating cycles consisting of charging and discharging actions 150 times, the capacity retention rates of the lithium secondary batteries of Examples 1 and 2 and Comparative Examples 1 to 5 at 45° C. were measured, and the results are shown in the following Table 2.

TABLE 2

| | Initial capacity (mAh/g) | Capacity retention rate at 150$^{th}$ cycle (%) |
|---|---|---|
| Example 1 | 212 | 83 |
| Example 2 | 211 | 82 |
| Comparative Example 1 | 209 | 65 |
| Comparative Example 2 | 206 | 60 |
| Comparative Example 3 | 190 | 40 (sudden drop occurred) |
| Comparative Example 4 | 205 | 85 |
| Comparative Example 5 | 208 | 55 |

Referring to the above Table 2, it can be seen that the initial capacity and cycle characteristics of the positive electrode active materials manufactured in Examples 1 and 2 were excellent as compared to the positive electrode active materials manufactured in Comparative Examples 1 to 3 and Comparative Example 5.

On the other hand, in the case of Comparative Example 4 where an excessive amount of anhydrous lithium hydroxide was used, it can be seen that initial capacity decreased by 3 to 4% as compared to Examples 1 and 2. Considering that it is very difficult to increase initial capacity by 2% or more in a battery of the same specifications in the field of battery technology, increasing initial capacity by 3 to 4% or more is a very remarkable effect.

In addition, although Comparative Example 4 had a high capacity retention rate, since the capacity retention rate is a ratio of capacity after 150 cycles with respect to the initial capacity, in the case of Comparative Example 4 having low initial capacity, the absolute discharge capacity itself after 150 cycles appears to be smaller than Example 1.

On the other hand, in the case of Comparative Example 5 in which one firing step was carried out, it can be seen that excellent initial capacity characteristics as compared to Comparative Examples 1 to 4 were exhibited, but cycle characteristics were significantly degraded. This is presumed to be because the crystal structures of the positive electrode active materials were not sufficiently developed with only one firing step.

Experimental Example 4: High-Temperature Storage Characteristics

The high-temperature storage characteristics of the secondary batteries of Examples 1 and 2 and Comparative Examples 1 to 5 manufactured in the above-described Experimental Example 3 were evaluated.

Specifically, each of the secondary batteries of Examples 1 and 2 and Comparative Examples 1 to 5 was fully charged to 4.25 V and then stored at 60° C. for three weeks.

Before storage, the discharge capacity and resistance of the fully charged secondary batteries were measured.

The fully charged secondary batteries were moved from a high-temperature chamber to a room-temperature chamber (25° C.) on a weekly basis and subjected to high-speed discharging at a 3 C rate at 50% State-of-Charge (SOC). The discharge capacity and resistance at the time were measured and compared with the discharge capacity and resistance values of the secondary batteries measured before storage, and a capacity retention rate and a resistance increase rate were determined by calculation. The results are shown in the following Table 3.

TABLE 3

| | Capacity retention rate (%) | Resistance increase rate (%) |
|---|---|---|
| Example 1 | 92 | 10 |
| Example 2 | 92 | 10 |
| Comparative Example 1 | 80 | 15 |
| Comparative Example 2 | 85 | 20 |
| Comparative Example 3 | 60 | 50 |
| Comparative Example 4 | 92 | 10 |
| Comparative Example 5 | 88 | 30 |

Referring to the above Table 3, in the case of the secondary batteries manufactured in Examples 1 and 2, it can be seen that the capacity retention rate and resistance increase rate after high-temperature storage were excellent as compared to Comparative Examples 1 to 3 and Comparative Example 5.

The invention claimed is:
1. A method of manufacturing a positive electrode active material for a lithium secondary battery, comprising:
a first step of preparing an anhydrous lithium raw material, wherein the anhydrous lithium raw material is LiOH comprising pulverizing hydrated lithium hydrox- ide (LiOH·H2O) having an average particle size (D50) of 300 μm or more until the average particle size (D50) becomes 50 μm to 250 μm to form a primary pulverized lithium hydroxide, vacuum-drying the primarily pulverized lithium hydroxide at 100° C. to 150° C. for 1 hour to 30 hours to form a vacuum-dried lithium hydroxide, and subsequently secondarily pulverizing the vacuum-dried lithium hydroxide until the average particle size (D50) becomes 5 μm to 30 μm;

a second step of dry-mixing a transition metal hydroxide and the anhydrous lithium raw material to form a mixture;

a third step of subjecting the mixture of the transition metal hydroxide and the anhydrous lithium raw material to primary firing to form a primarily fired material; and a fourth step of finely pulverizing and mixing the primarily fired material and subsequently performing secondary firing, and thus obtaining a lithium transition metal oxide, wherein, in the second step, the anhydrous lithium raw material is mixed at 40 parts by weight or less based on 100 parts by weight of the transition metal hydroxide.

2. The method of claim 1, wherein, in the second step, the anhydrous lithium raw material is mixed at 10 parts by weight to 40 parts by weight based on 100 parts by weight of the transition metal hydroxide.

3. The method of claim 1, wherein each of the primary firing and the secondary firing is carried out in an oxygen atmosphere.

4. The method of claim 1, wherein each of the primary firing and the secondary firing is carried out in an oxygen atmosphere with an oxygen concentration of 80% or more by volume.

5. The method of claim 1, wherein the primary firing is carried out at a temperature of 400° C. to 700° C.

6. The method of claim 1, wherein the secondary firing is carried out at a temperature of 700° C. to 900° C.

7. The method of claim 1, further comprising, after the fourth step, a fifth step of mixing the lithium transition metal oxide with a washing solution and thus removing a lithium by-product present on a surface of the lithium transition metal oxide.

8. The method of claim 7, further comprising, after the fifth step, a sixth step of forming a coating layer including one or more selected from the group consisting of B, Al, Nb, W, Mo, Zr, Ti, Y, Ce, yttria-stabilized zirconia (YSZ), calcia-stabilized zirconia (CSZ), indium tin oxide (ITO), and Sr on a surface of the lithium transition metal oxide.

* * * * *